United States Patent
Reinhoudt

[11] 3,870,382
[45] Mar. 11, 1975

[54] AXIAL BEARING

[75] Inventor: Jacobus Pieter Reinhoudt, Emmasingel, Eindhoven, Netherlands

[73] Assignee: U. S. Philips Corporation, New York, N.Y.

[22] Filed: Aug. 7, 1973

[21] Appl. No.: 386,337

[30] Foreign Application Priority Data
Sept. 29, 1972 Netherlands.................. 7213192

[52] U.S. Cl..................................... 308/9, 308/160
[51] Int. Cl. ............................................ F16c 39/04
[58] Field of Search........................ 308/18, 9, 170

[56] References Cited
FOREIGN PATENTS OR APPLICATIONS
1,525,190    8/1969    Germany ............................... 308/9

Primary Examiner—M. Henson Wood, Jr.
Assistant Examiner—Robert Saifer
Attorney, Agent, or Firm—Frank R. Trifari

[57] ABSTRACT

An axial bearing comprising two faces which are rotatable with respect to each other and which are provided with groove patterns which produce, upon relative movement of the faces, oppositely directed pressures in a medium which is present between the two faces. For a given direction of rotation one pattern produces a positive bearing force which is substantially dependent on the gap height and has high stiffness, while the other pattern, whose grooves are deeper than those of the first pattern, produces a negative bearing force which is only slightly gap-dependent and has low stiffness, so that for a given gap height the axial bearing force is zero.

3 Claims, 5 Drawing Figures

AXIAL BEARING

The invention relates to an axial bearing comprising two faces which are rotatable with respect to each other, the bearing comprising at least two groove patterns which, upon relative rotation of the faces, produce oppositely directed pressures in a medium which is present in a gap which arises between the two faces during operation.

A bearing of this kind is known from British Patent Specification 1,068,448. The known bearing, intended for two directions of rotation, offers a high stiffness and a large bearing force in each of the two directions of rotation.

The drawback of the known bearing is that the high rigidity is accompanied by a large bearing force, which means that the bearing must be loaded by additional means in applications where stiffness is required but the load is small. This large load gives rise to deformation of the faces. Moreover, steps must be taken to ensure temporary removal of the load during starting when the two faces contact each other because otherwise wear will occur.

These problems are encountered inter alia in the journalling of very light parts, where it is desirable that the bearing faces are situated at a constant distance from each other during operation. These problems are also experienced with bearings which must function in space in weightless conditions.

The object of the invention is to eliminate these drawbacks and to provide a bearing for use with one given direction of rotation, the bearing force being eliminated at a given gap height while a high stiffness is maintained.

To this end, an axial bearing according to the invention has the geometry of the groove patterns chosen such that in the given direction of rotation one pattern produces a positive bearing force which is substantially dependent on the gap height, and a high stiffness; while the other pattern, whose grooves are deeper than those of the first pattern, produces a negative bearing force which is only slightly dependent on the gap, and a low stiffness. The arrangement is such that at a given gap height the sum of the two bearing forces is zero and the bearing has a high positive rigidity.

The invention results in a bearing suitable for one given direction of rotation, which does not require a press-on force at a given gap height, and which has a high stiffness. The bearing according to the invention has the additional advantage that the gap between the two faces is independent, at a bearing force which is equal to zero, of the speed and of the viscosity of the medium present in the bearing.

This invention offers the advantage that the bearing can be used for the journalling of very light or weightless parts, without the bearing having to be pre-loaded by additional means, the associated drawbacks thus also being avoided. Furthermore, as a result of the high stiffness, the gap height will not be varied or hardly be varied by any load variations. This implies a substantially constant gap height which is advantageous for many applications. As will be obvious from the foregoing, in this context stiffness is to be understood to mean the load variation divided by the associated gap height variation.

In preferred embodiment of the bearing according to the invention, in which the two groove patterns are provided in annular regions which are concentric with respect to each other, the groove pattern which produces the bearing force which is substantially dependent on the gap height is provided in the outer annular region, while the groove pattern which is only slightly gap-dependent is provided in the inner annular region.

The fact that the groove pattern producing the large bearing force and the high rigidity is provided in the outer ring has the advantage that the bearing also offers high rigidity against tilting, with the result that very stable journalling is obtained.

In a further preferred embodiment according to the invention, the groove depth of the pattern producing the bearing force which is substantially dependent on the gap height and is substantially equal to the gap height, the groove depth of the groove pattern which is only slightly gap-dependent amounts to at least 5 times the depth of the grooves of the first pattern.

The invention will be described in detail hereinafter with reference to the drawing.

Figure 1:
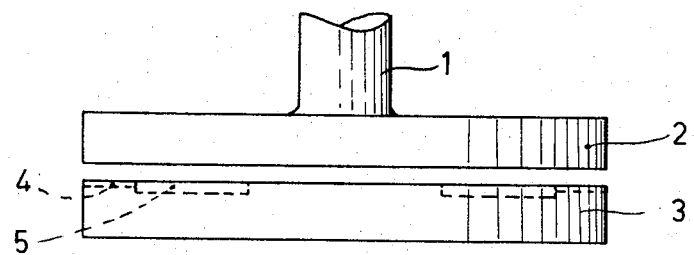
FIGS. 1 and 2 are a diagrammatic partial front view and a partial sectional view of a spiral groove bearing (not to scale).
Figure 2:
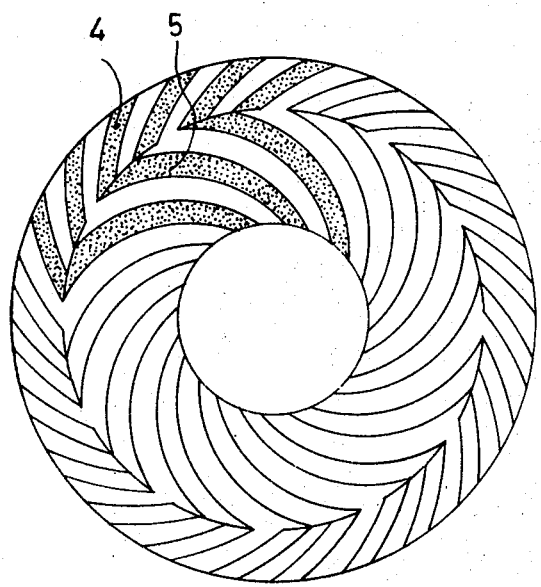

The reference numeral 1 in FIGS. 1 and 2 denotes a shaft on which a first rotatable bearing part 2 is connected. The stationary bearing part 3 is provided with two groove patterns 4 and 5 which extend over two regions which are concentrically arranged with respect to each other.

The grooves of the groove pattern 4 are very shallow, i.e. in the order of a $\mu$m, so that this pattern will produce a bearing force which is extremely dependent on the gap height upon rotation. The bearing force of this groove pattern 4 is plotted in FIG. 3 versus the gap height, resulting in the line 6. In addition to a high bearing force, this pattern also produces a high positive stiffness, as appears from FIG. 3, which means that small gap height variations are accompanied by large bearing force variations.

The groove pattern 5 comprises grooves having a depth which is at least 5 times larger than the depth of the grooves of pattern 4. Consequently, these grooves have a depth of 10 $\mu$m or more, and as a result the bearing force of this groove pattern will depend only little from the gap height as appears also from FIG. 3 in which the bearing force of pattern 5 is denoted by line 7. It also appears from this figure that this bearing is only suitable for one direction of rotation, i.e. the direction of rotation at which pattern 4 produces a positive bearing force and pattern 5 produces a negative bearing force as a result of the opposite direction of its groove. The sum of these bearing forces $\Delta$ F is denoted by the line 8 in FIG. 4. It appears that the bearing force of the bearing is zero for gap height $h_1$. The stiffness of the bearing is high and positive on both sides of the gap height $h_1$, with the result that, should load variations occur, they can be taken up without the gap height noticeably deviating from $h_1$. This means that a bearing is obtained which has a bearing force equal to zero at a given gap height and a high positive stiffness.

Figure 3:
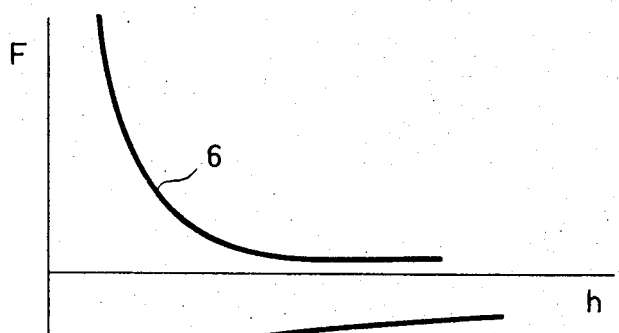
FIGS. 3 and 4 are graphs which show how the bearing force of the bearing according to FIGS. 1 and 2 varies as the height of the gap between the bearing faces varies.
Figure 4:
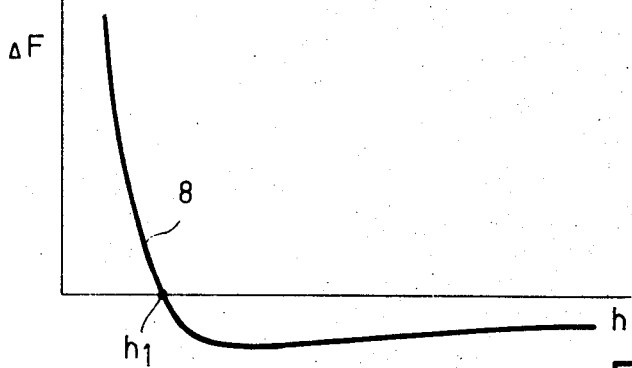

For the construction of such a bearing, the desired gap height can be taken as a basis; the depth of the grooves of pattern 4 must then be chosen to be approximately equal thereto, and the grooves of pattern 5 at least 5 times deeper. A bearing is then obtained which has a bearing force characteristic as shown in FIGS. 3 and 4; by a suitable choice of the other parameters of the groove patterns which influence the value of the bearing forces, the desired characteristic for $\Delta F$ as shown in FIG. 4 is obtained. It appears that the speed and the viscosity of the medium between the bearing faces have no effect on the gap height, with the result that regardless thereof always the same gap height is obtained.

Figure 5:
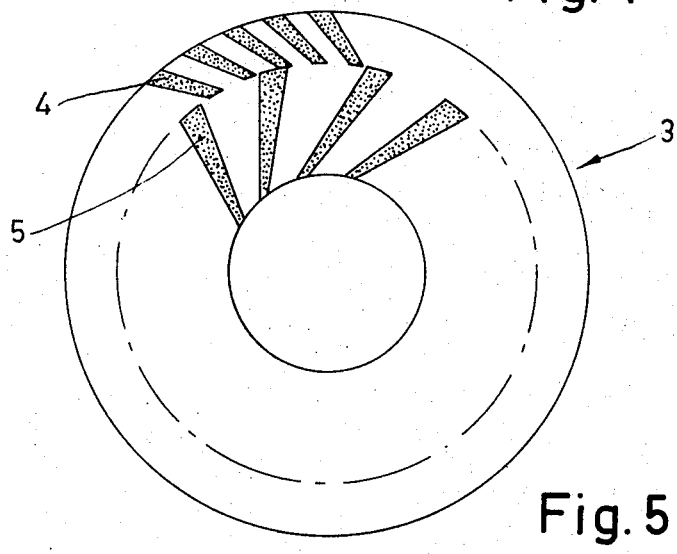
FIG. 5 is a diagrammatic representation of a bearing comprising straight grooves.

In FIGS. 1 and 2, the groove pattern 4 is situated in an outer concentric ring and the groove pattern 5 is situated in an inner concentric ring. Due to the high rigidity of the pattern 4, this has a favorable effect on the tilting stiffness of the bearing. If no severe requirements are imposed in this respect, the position of the patterns 4 and 5 can be interchanged. If desired, both groove patterns, or one groove pattern, can be provided in the other bearing part 2. Even though the grooves in the bearing shown in FIGS. 1 and 2 are designed as spiral grooves, other groove shapes can alternatively be used, for example, straight grooves, as is diagrammatically shown in FIG. 5.

Instead of flat bearings, according to the foregoing convex or conical bearings can alternatively be made, the two groove patterns then being provided on a convex or conical surface, respectively.

What is claimed is:

1. An axial bearing of the type having two faces rotatable with respect to each other, a medium present in a gap between the two faces during operation of the bearing, and at least two groove patterns which, upon relative rotational movement of the faces, produce oppositely directed pressures in the medium, wherein the geometry of the groove patterns is such that, for a given direction of rotation, a first pattern produces a positive bearing force dependent on the gap height with a high stiffness, and a second pattern having grooves deeper than the grooves of the first pattern produces a negative bearing force with low stiffness, so arranged that a gap height exists at which the two bearing forces are equal and opposite, and the bearing has a high positive rigidity.

2. An axial bearing as claimed in claim 1, wherein said groove patterns are provided in concentric annular regions, said first pattern being in an outer annular region, whereby said bearing has high tilting stiffness.

3. An axial bearing as claimed in claim 1, wherein said first pattern has grooves of a depth approximately equal to the gap height, and said second pattern has grooves of a depth at least five times the depth of the first pattern.

* * * * *